United States Patent
Loewen et al.

(10) Patent No.: US 11,170,906 B2
(45) Date of Patent: Nov. 9, 2021

(54) PASSIVE ELECTRICAL COMPONENT FOR SAFETY SYSTEM SHUTDOWN USING GAUSS' LAW OF MAGNETISM

(71) Applicant: GE-Hitachi Nuclear Energy Americas LLC, Wilmington, NC (US)

(72) Inventors: Eric P. Loewen, Wilmington, NC (US); David W. Webber, Wilmington, NC (US); Seth Ryan Paul Strege, Wilmington, NC (US); Maria E. Pfeffer, Wilmington, NC (US); Scott L. Pfeffer, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 241 days.

(21) Appl. No.: 16/176,618

(22) Filed: Oct. 31, 2018

(65) Prior Publication Data

US 2020/0135354 A1 Apr. 30, 2020

(51) Int. Cl.
| | |
|---|---|
| G21D 3/06 | (2006.01) |
| G21C 7/36 | (2006.01) |
| G21C 9/012 | (2006.01) |
| G21C 9/02 | (2006.01) |

(52) U.S. Cl.
CPC ................ *G21D 3/06* (2013.01); *G21C 7/36* (2013.01); *G21C 9/012* (2013.01); *G21C 9/02* (2013.01)

(58) Field of Classification Search
CPC . G21D 3/06; G21C 9/012; G21C 9/02; G21C 9/00; Y02E 30/30; Y02E 30/00
See application file for complete search history.

(56) References Cited

U.S. PATENT DOCUMENTS

| | | | |
|---|---|---|---|
| 2,673,265 A | 3/1954 | Frederik | |
| 3,115,450 A | 12/1963 | Schanz | |
| 3,660,231 A | 5/1972 | Fox et al. | |
| 4,949,362 A | 8/1990 | Gaubatz | |
| 4,957,690 A | 9/1990 | Fennern | |
| 5,872,496 A * | 2/1999 | Asada | H01H 50/005 335/78 |
| 7,614,233 B2 | 11/2009 | Chaki et al. | |

(Continued)

OTHER PUBLICATIONS

"DCIS Integration Tests for Lungmen Nuclear Power Plant"; Jiin-Ming Lin and Jeen-Yee Lee; Department of Nuclear Engineering, Taiwan Power Compoany; NPIC&HMIT 2017; Jun. 11-15, 2017; pp. 1962-1971.

(Continued)

*Primary Examiner* — Dominic E Hawkins
(74) *Attorney, Agent, or Firm* — Harness, Dickey & Pierce, P.L.C.

(57) ABSTRACT

An electro-technical device, includes an input electrical connection supplied with an input signal and electrically isolated from an output electrical connection. A bar magnet is pivotally mounted on a pedicel between the input electrical connection and the output electrical connection. A pair of coils disposed on opposite sides of the bar magnet and each being supplied with an electronic signal from a sensor, the bar magnet being responsive to an electromagnetic filed generated by the pair of coils to cause the bar magnet to contact the input electrical connection and the output electrical connection and complete a circuit and send out a control signal.

6 Claims, 4 Drawing Sheets

(56) References Cited

U.S. PATENT DOCUMENTS

2009/0261927 A1* 10/2009 Shen .................... H01H 50/005
335/78
2014/0007697 A1* 1/2014 Kittaka .................... G01F 1/60
73/861.11

OTHER PUBLICATIONS

International Search Report and Written Opinion dated Mar. 20, 2020 (corresponding to PCT/US2019/058506).

* cited by examiner

PASSIVE ELECTRICAL COMPONENT FOR SAFETY SYSTEM SHUTDOWN USING GAUSS' LAW OF MAGNETISM

BACKGROUND

Field

The present disclosure relates to a safety system shutdown including a passive electrical component that senses a system parameter and becomes tripped if a predetermined set point is reached so that a signal is sent to take an action in the system. The passive electrical component makes use of the principles of Gauss' Law of Magnetism.

Description of Related Art

This section provides background information related to the present disclosure which is not necessarily prior art.

Modern nuclear reactors use a variety of digital systems for both control and safety, referred to as a Distributed Control and Information System (DCIS). These systems must be redundant, diverse, fault tolerant, and have extensive self-diagnosis while the system is in operation. Meanwhile, the nuclear digital industry is concerned with common cause software failure. Even more damaging is a cyberattack to, or through, the system safety systems. In the digital industry, the desire to increase computational power while decreasing component size results in a very small digital device with embedded software. It is very difficult to convince a regulatory body that these systems cannot have a common cause failure. Even more damaging operations can occur when this compact digital system is subjected to a cyberattack. These extreme unknown conditions of a nuclear power plant safety system lead to the cause for redundancy, independence, and determinacy, all of which contribute to significant added cost.

FIG. 6 schematically shows a conventional distributed control and information system (DCIS) 200 with both a safety portion 202 and non-safety portion 204 that are interfaced by a control panel 203. The present disclosure is directed to the safety portion 202 of the DCIS 200 which is shown in FIG. 7. The safety portion 202 of the DCIS 200 includes four independently designed divisions 202A-202D which each receive measured system signals that are collected and sent from a remote multiplexer unit RMU 205 which provides output to the digital trip module DTM 206 which each provide outputs to the trip logic units TLU 208 which each provide an output signal to the output logic unit OLU 210. The conventional safety portions 202 use a voting logic of at least 2 out of 4 of the different divisions 202A-202d receiving like signals in order to determine a fault (i.e. pressures and temperatures are not compared against each other). It becomes more difficult for the nuclear power plant control system designer, purchaser, installer, and operator to establish and trace the essential safety signals to ensure the system is performing as designed. A device and method is needed on a scale that humans can vary "signal flow" or "trace the flow of electrons/data so that the system is immune from cyber-attack.

SUMMARY

This section provides a general summary of the disclosure, and is not a comprehensive disclosure of its full scope or all of its features.

The present disclosure provides electro-technical devices that, coupled to control systems, can provide passive system safety shutdown using Guass' Law of magnetism. These devices will solve the issue of common cause software failure or cyber security attacks that are inherent limitations of digital safety systems. The Gauss Law of magnetism contactor provides an electro-technical device that can be set up in multiple configurations to protect a nuclear power plant, or another sensitive infrastructure. The Gauss Law of magnetism contactor can be produced using metallic and plastic 3-D printing machines that can be utilized to ensure consistent manufacture of the electrotechnical device for which the manufacturing data can be captured and stored for utilization in confirming the device's consistent operational characteristics. The devices use a simple pass/fail or go/no-go check to convey to an electrical safety system to change state to safe shutdown. The printed device is placed into the safety system to perform 3 basic tasks: sense a system parameter (e.g. temperature, flow, pressure, power or rate of change), if the predetermined set point is reached—result in a "tripped" state, and lastly, if the safety system logic is met—send a signal to take an action in the system, such as shutdown. In the event of normal power supply loss, the Gauss Law of magnetism contactor can fail as either is or fail in a safe state, depending on user requirements. The system prevents any loss of the safety function of the digital device due to power outage. The device also eliminates failures due to software or digital cyber-attacks.

According to an aspect of the present disclosure, an electro-technical device includes an input electrical connection supplied with an input signal and electrically isolated from an output electrical connection. A bar magnet is pivotally mounted on a pedicel between the input electrical connection and the output electrical connection. At least one coil is disposed adjacent the bar magnet and is supplied with an electronic signal from a sensor, the bar magnet being responsive to an electromagnetic filed generated by the at least one coil to cause the bar magnet to contact the input electrical connection and the output electrical connection and complete a circuit and send out a control signal.

According to a further aspect, the at least one coil includes a pair of coils disposed on opposite sides of the bar magnet and each being supplied with an electronic signal from a sensor A fault detection system for a nuclear reactor includes a plurality of contactors each including an input electrical connection supplied with an input signal and electrically isolated from an output electrical connection. A bar magnet is pivotally mounted on a pedicel between the input electrical connection and the output electrical connection and a pair of coils are disposed on opposite sides of the bar magnet and each being supplied with an electronic signal from a sensor. The bar magnet is responsive to an electromagnetic field generated by the pair of coils to cause the bar magnet to contact the input electrical connection and the output electrical connection and complete a circuit and send out a control signal.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
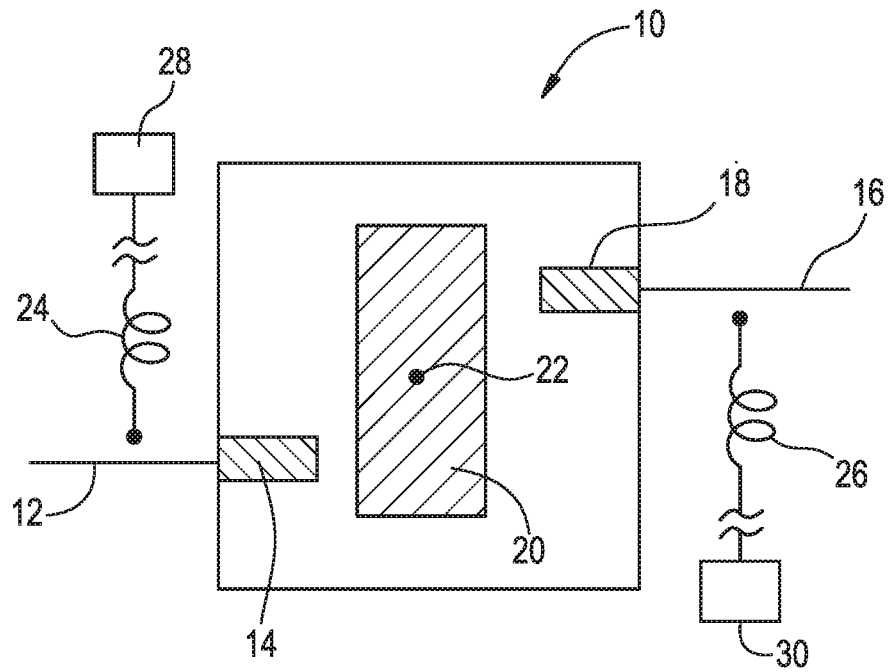
FIG. 1 is a schematic illustration of a Gauss Law of Magnetism contactor according to the principles of the present disclosure shown in an open state.
Figure 2:
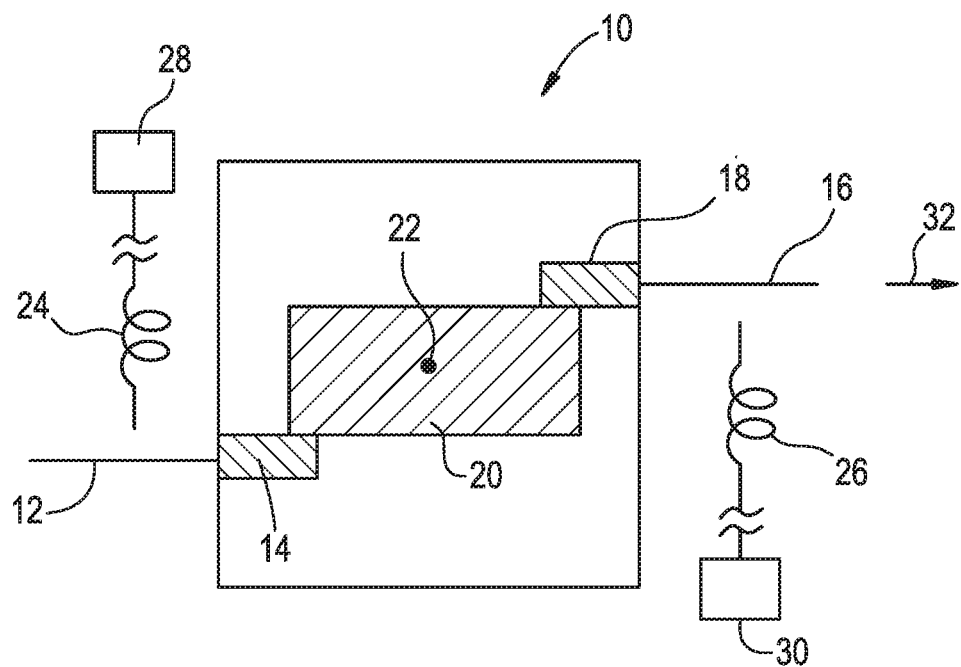
FIG. 2 is a schematic illustration of the Gauss Magnetism law contactor shown in FIG. 1 shown in a closed state.
Figure 3:
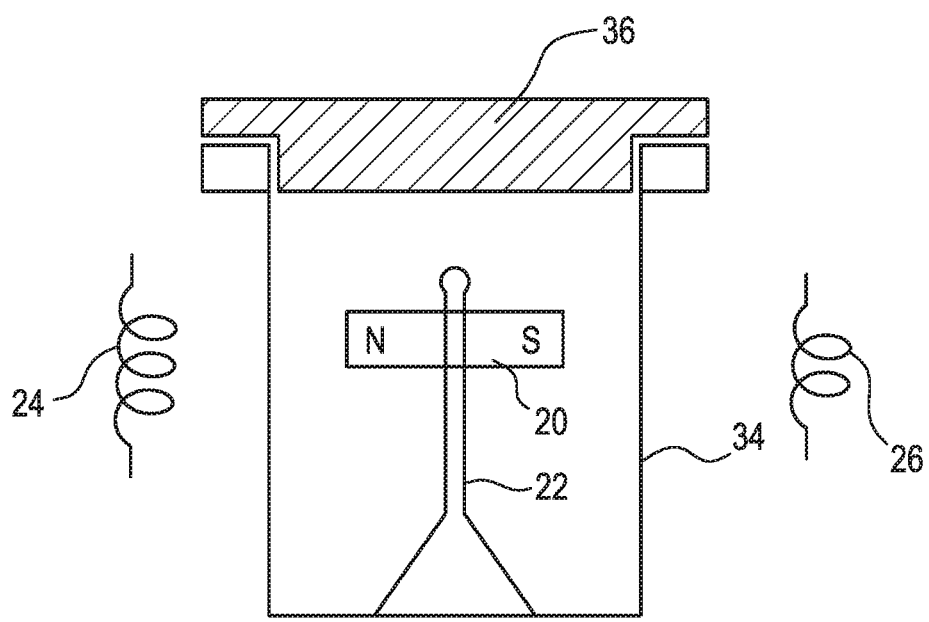
FIG. 3 is a schematic side view of the Gauss Magnetism law contactor shown in FIG. 1.

With reference to FIGS. 1-3, a Gauss Law of Magnetism contactor 10 according to the principles of the present disclosure will now be described. As shown in FIG. 1, the Gauss Law of Magnetism contactor 10 includes an input signal 12 having an electrical connection point 14 and an output signal 16 having an electrical connection point 18. In FIG. 1, an open state is shown. The Gauss Law of Magnetism contactor 10 includes a bar magnet 20 rotatably supported on a pedicel 22 between the input electrical connection point 14 and the output electrical connection point 18. A first coil 24 is positioned adjacent to the input electrical connection point 14 and a second coil 26 is positioned adjacent to the output electrical connection point 18. One or both of the coils 24, 26 can have an electrical current passing through them (i.e. 4 to 20 mA standard signal) from a pair of sensors 28, 30 that can sense one of a temperature, pressure, flow or other parameter. The engineered direction of current flow in both coils 24, 26 results in the south pole in the region of the input electrical connection point 14 and the north pole in the region of the output connection point 18. These externally induced magnetic fields result in the magnetic rotation of the bar magnet 20.

FIG. 2 shows that repositioning of the bar magnet 20 due to increased current flow from the sensors 28, 30 passing through the coils 24, 26 causing the electrical connection between the input electrical connection 14 and output electrical connection point 18 so that a safety system action signal 32 can be sent. FIG. 3 provides a side view of the Gauss Law of Magnetism contactor 10 illustrating the magnet 20 placed inside a non-magnetic box 34 on the pedicel 22. The magnet 20 rotates about the pedicel 22, and the box 34 is sealed with a lid 36. As an alternative, the reverse circuit can be set up to open (rather than close) the Gauss Law of Magnetism contactor 10 to de-energize a system for a protective feature.

Figure 4:
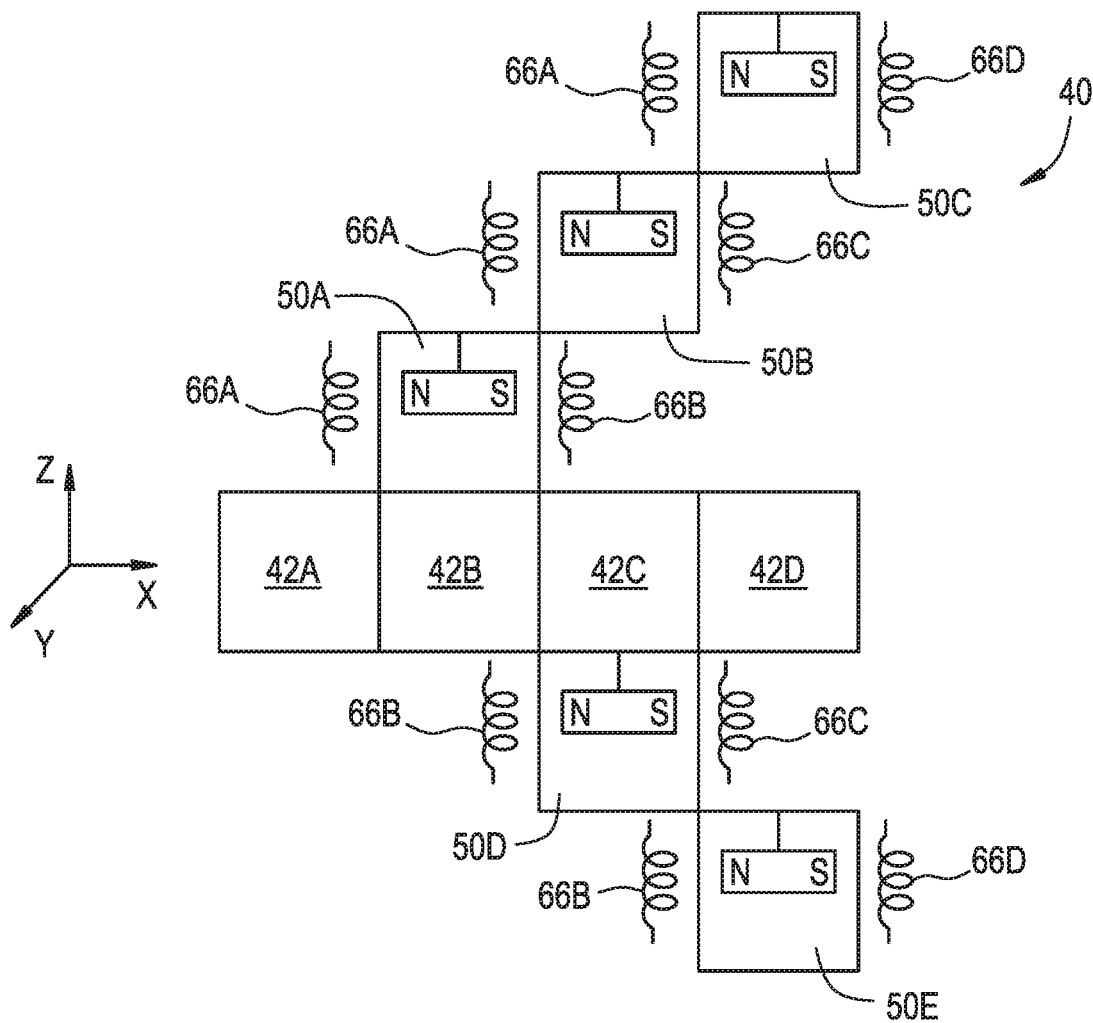
FIG. 4 is a schematic side view in the X and Z plane of a Gauss Magnetism law contactor having multiple inputs according to the principles of the present disclosure.
Figure 5:
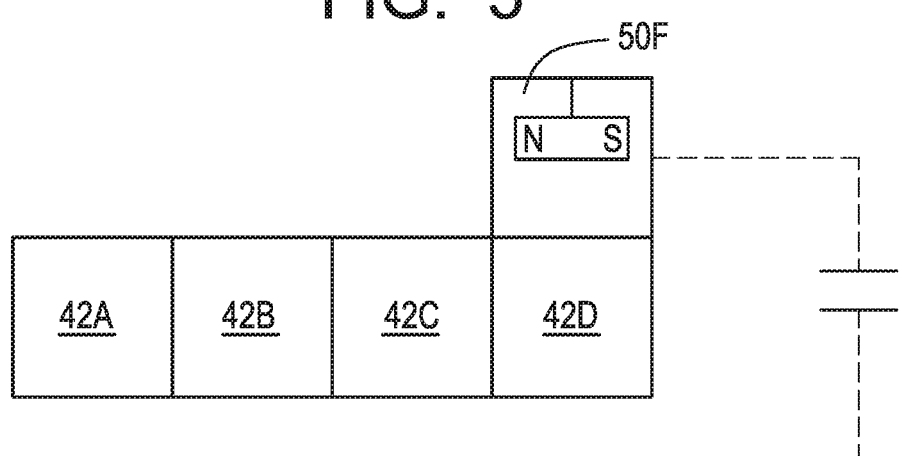
FIG. 5 is a schematic side view in the Z-direction of a Gauss Magnetism law contactor having multiple inputs according to the principles of the present disclosure.
Figure 6:
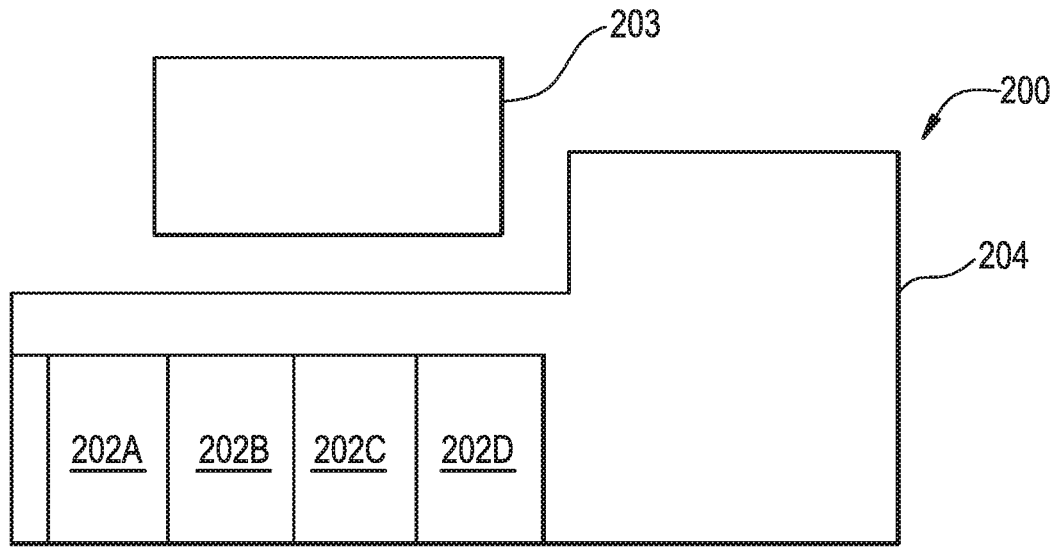
FIG. 6 is a schematic view of a conventional digital system of a distributed control and information system for a nuclear reactor.
Figure 7:
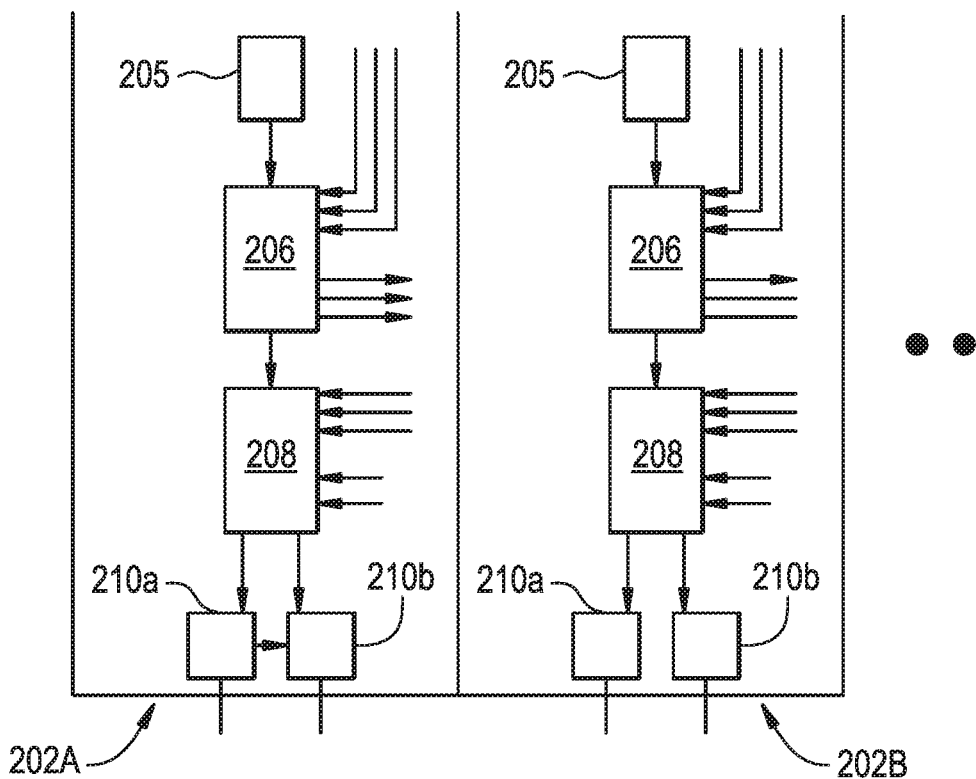
FIG. 7 is a schematic view of a safety portion of the conventional digital system of a distributed control and information system as shown in FIG. 6.

FIGS. 4 and 5 provide a schematic view of a nuclear safety system 40 using Gauss' Law of Magnetism. The nuclear safety system 40 utilizes four independent divisions 42A-42D for each division of the safety system. In a 4-division safety system utilizing a 2 out of 4 logic of like signals (A, B, C, D), there are six states including AB, AC, AD, BC, BD and CD to reach a tripped state. FIG. 4 provides a side view in the X and Z plane. In the positive Z direction, the AB, AC and AD trip states are attained by the Gauss magnetism Law contactors 50A, 50B and 50C, respectively. The Gauss Magnetism law contactor 50A receives current through the respective coils 66A, 66B from the divisions 42A and 42B. The Gauss Magnetism law contactor 50B receives current through the respective coils 66A, 66C from the divisions 42A and 42C. The Gauss Magnetism law contactor 50C receives current through the respective coils 66A, 66D from the divisions 42A and 42D. In the negative Z direction the BC and BD trip states are attained by the Gauss Magnetism law contactors 50D, 50E, respectively. The Gauss Magnetism law contactor 50D receives current through the respective coils 66B, 66C from the divisions 42B and 42C. The Gauss Magnetism law contactor 50E receives current through the respective coils 66B, 66D from the divisions 42B, and 42D. FIG. 5 provides a side view in the positive Y direction which provides the CD tripped state. The Gauss Magnetism law contactor 50F receives current through the respective coils 66C, 66D from the divisions 42C and 42D. Thus, sensors from two out of four divisions 42A-42D can be activated causing an increased current to flow through the two respective coils 66A-66D and triggering one or more of the Gauss magnetism law contactors 50A-50F in any of 6 states so that an output signal is sent and a safety action occurs. The six Gauss magnetism law contactors 50A-50F replace the DTM, TLU and OLU of the safety divisions 202A-202D previously described in FIGS. 6 and 7.

The present disclosure envisions the use of the following operating modes. During steady-state operation of the devices, a current (4 to 20 mA) is supplied to drive the devices. If the current exceeds the device baseline due to, for example, a sensed temperature rise above a predetermined level or a pressure rise above a predetermined level, the safety system response is actuated. If there is a loss of primary power, an uninterruptible power supply is used to maintain a constant voltage level within the circuitry. The electricity from this secondary supply will also be fed to the safety measuring devices, and the loss results in the safe shutdown of the system. In the event of a loss of all power, then the system either fails as is or to a safety state, depending on how the device is placed into an architecture by the circuit designer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electro-technical device, comprising:
    an input electrical connection supplied with an input signal and electrically isolated from an output electrical connection; and
    a bar magnet pivotally mounted on a pedicel between the input electrical connection and the output electrical connection; and
    at least one coil disposed adjacent to the bar magnet and being supplied with an electronic signal from a sensor, the bar magnet being responsive to an electromagnetic field generated by the at least one coil to cause the bar magnet to pivot to simultaneously come into contact with both the input electrical connection and the output electrical connection and complete a circuit and send out a control signal.

2. The electro-technical device according to claim 1, further comprising a housing for enclosing the bar magnet, the pedicel, the input electrical connection and the output electrical connection.

3. An electro-technical device, comprising:
    an input electrical connection supplied with an input signal and electrically isolated from an output electrical connection; and
    a bar magnet pivotally mounted on a pedicel between the input electrical connection and the output electrical connection; and
    at least one coil disposed adjacent to the bar magnet and being supplied with an electronic signal from a sensor, the bar magnet being responsive to an electromagnetic field generated by the at least one coil to cause the bar magnet to contact the input electrical connection and the output electrical connection and complete a circuit and send out a control signal, wherein the at least one coil includes a pair of coils including a first coil connected to one of a temperature sensor, a pressure sensor and a flow sensor and a second coil connected to a second one of a temperature sensor, a pressure sensor and a flow sensor.

4. A fault detection system for a nuclear reactor, comprising: a plurality of contactors each including;
    an input electrical connection supplied with an input signal and electrically isolated from an output electrical connection;
    a bar magnet pivotally mounted on a pedicel between the input electrical connection and the output electrical connection; and
    a pair of coils disposed on opposite sides of the bar magnet and each being supplied with an electronic signal from a sensor, the bar magnet being responsive to an electromagnetic filed generated by the pair of coils to cause the bar magnet to pivot to simultaneously come into contact with both the input electrical connection and the output electrical connection and complete a circuit and send out a control signal.

5. The fault detection system according to claim 4, wherein each of the plurality of contactors further comprising a housing for enclosing the bar magnet, the pedicel, the input electrical connection and the output electrical connection.

6. The fault detection system according to claim 4, wherein the pair of coils include a first coil connected to one of a temperature sensor, a pressure sensor and a flow sensor and a second coil connected to a second one of a temperature sensor, a pressure sensor and a flow sensor.

* * * * *